United States Patent [19]

Tremper et al.

[11] Patent Number: 4,825,512
[45] Date of Patent: May 2, 1989

[54] SEALLESS STRAP CONNECTION

[75] Inventors: Donald R. Tremper, Mt. Prospect; Timothy B. Pearson, Antioch, both of Ill.

[73] Assignee: Signode Corporation, Glenview, Ill.

[21] Appl. No.: 127,449

[22] Filed: Dec. 2, 1987

[51] Int. Cl.$^4$ .............................................. B65D 63/02
[52] U.S. Cl. ................................. 24/20 EE; 24/23 EE
[58] Field of Search ............. 24/20 R, 20 EE, 23 EE; 403/393

[56] References Cited

U.S. PATENT DOCUMENTS

| | | | |
|---|---|---|---|
| 156,262 | 10/1874 | Terrell | 24/20 EE |
| 182,031 | 9/1876 | Millingar | 24/20 EE |
| 2,035,351 | 3/1936 | Taylor | 24/20 EE |
| 2,253,874 | 8/1941 | Tucker et al. | 403/393 |
| 2,269,285 | 1/1942 | Ott | 403/393 |
| 2,276,988 | 3/1942 | Leslie . | |
| 3,188,706 | 6/1965 | Partridge . | |
| 3,234,610 | 2/1966 | Timmerbeil et al. | 24/20 EE |
| 3,935,616 | 2/1976 | Simmons . | |
| 4,031,594 | 6/1977 | Cepuritis . | |
| 4,048,697 | 9/1977 | Duenser . | |
| 4,062,086 | 12/1977 | Wojcik . | |
| 4,226,007 | 10/1980 | Duenser . | |
| 4,228,565 | 10/1980 | Lems et al. . | |

Primary Examiner—Victor N. Sakran
Attorney, Agent, or Firm—Dressler, Goldsmith, Shore, Sutker & Milnamow

[57] ABSTRACT

An improvement in a sealless connection between two overlapped segments of strapping. The sealless connection comprises a plurality of joints arrayed longitudinally, each comprising a pair of shoulders, which interlock when the segments are tensioned. The connection further comprises notches provided respectively in superposed edges on opposite sides of the respective segments and operable as an "anti-reverse" locking means. The notches are provided after the shoulders are interlocked. The segments are formed at the notches to prevent the segments from shifting longitudinally to unlock the interlocked shoulder. The notched edges of the respective segments are uninterrupted, except for the notch, where the respective segments are crimped.

7 Claims, 1 Drawing Sheet

4,825,512

SEALLESS STRAP CONNECTION

FIELD OF THE INVENTION

This invention pertains to improvements in sealless connections for strapping.

BACKGROUND OF THE INVENTION

It is common to connect two overlapped segments of strapping, such as a tensioned loop of steel strap, by a so-called "sealless" connection, which does not employ a separate seal. Typically, such a connection employs one or two longitudinal rows of interlocking joints, each comprising a plurality of shoulders, which are defined by Z-shaped or other slits in the overlapped segments. The joints are adapted to interlock with each other when the overlapped segments are released under a tensile load. The overlapped segments shift longitudinally with respect to each other in a locking direction.

An "anti-reverse" locking means may be provided for the sealless strap which locking means prevents the overlapped, connected segments from shifting longitudinally to unlock the interlocking shoulders after providing the sealless connection. It may be necessary or desirable for the "anti-reverse" locking means to be provided after forming the sealless connection and interlocking the shoulders.

One example of an "anti-reverse" locking means, U.S. Pat. No. 3,188,706, discloses parallel, transverse cuts along respective edges of two overlapped, connected segments of strapping after a sealless connection has been made. Cuts form registering fingers, which are downwardly bent about longitudinal axes to prevent relative movement of the overlapped, connected segments in either longitudinal direction. Forces tending to produce longitudinal movement are sufficient to break off or distort one or more of the bent fingers.

U.S. Pat. No. 2,276,988 discloses ribs downwardly deformed between parallel, transverse cuts in two overlapped, connected segments of strapping after formation of a sealless connection.

As a further example, U.S. Pat. No. 3,188,706 discloses nested dimples formed in two overlapped, connected segments of strapping, after formation of a sealless connection.

SUMMARY OF THE INVENTION

The present invention provides an improved sealless connection between two overlapped segments of strapping, such as a tensioned loop of steel strap.

In accordance with known practices, the sealless connection comprises plural interlocking joints, which may be arranged in a longitudinal row, in two longitudinal rows, or otherwise. Each joint comprises plural shoulders, which are defined by Z-shaped or other slits in the segments, and which are displaced from adjacent portions of the respective segments, some being displaced upwardly, others being displaced downwardly. The shoulders are adapted to become interlocked with each other when the segments are shifted longitudinally in a locking direction. The shoulders tend to become unlocked from each other if the respective segments are shifted longitudinally in relation to each other in an opposite direction.

In accordance with the present invention, the sealless connection also comprises a notch, which is cut from overlapped edges of the respective segments into the respective segments after the shoulders have become interlocked with each other. The respective segments are formed at the notch, along axes oblique in relation to the respective segments to prevent shifting of the respective segments to prevent unlocking of the shoulders longitudinally in relation to each other direction. The edges of the respective segments are uninterrupted, except for the notch, where the respective segments are formed.

Preferably, the notch is one of two similar notches, which are provided respectively on opposite edges of the respective segments, and which are aligned with each other.

Preferably, the respective segments are formed only on one side of each notch, namely, the side facing away from a distal end of the upper segment. The segments are notched and deformed in a direction from a plane defined along the surface of the strap.

These and other objects, features, and advantages of this invention will be evident from the following description of a preferred embodiment of the invention, with reference to an accompanying drawing.

DETAILED DESCRIPTION OF PREFERRED EMBODIMENTS

Figure 1:
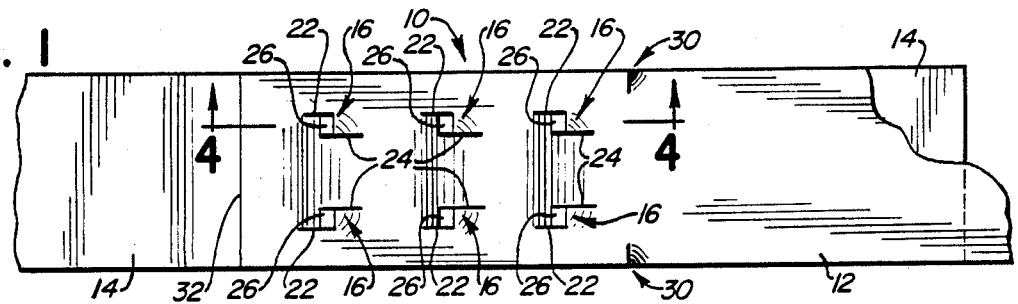
FIG. 1 is a fragmentary, top plan view of two overlapped segments of a tensioned loop of steel strap, as connected to each other by a sealless connection constituting a preferred embodiment of this invention, wherein shoulders have been formed in the respective segments and have become interlocked, thereafter notches are formed, in the segments, and the respective segments are formed at the notches.
Figure 2:
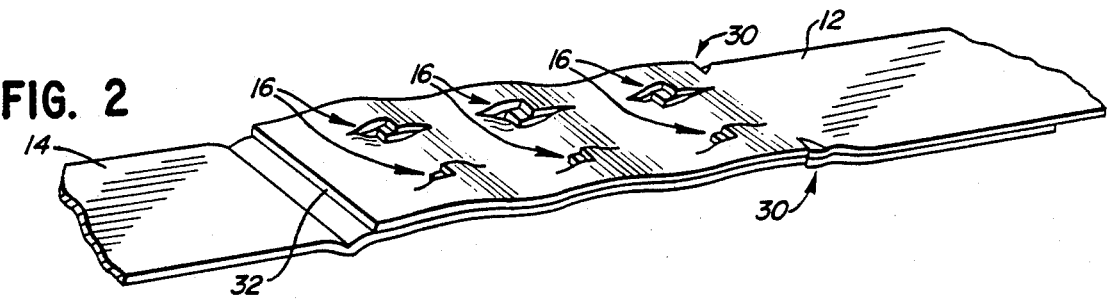
FIGS. 2 and 3, respectively, are fragmentary, perspective and bottom plan views of the overlapped, connected segments shown in FIG. 1.
Figure 3:
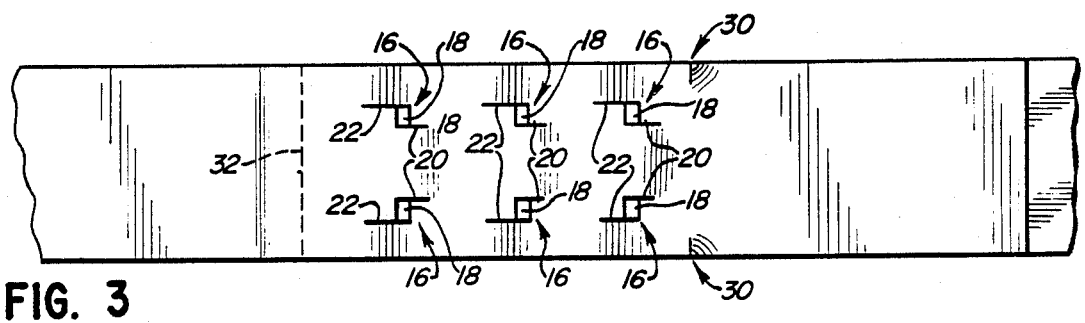

As shown in FIGS. 1, 2, and 3, an exemplary sealless connection 10 is used to connect overlapped upper and lower segments 12, 14, of a tensioned loop of steel strapping with a first edge and a second edge, which is applied by a strapping machine (not shown). The sealless connection 10 constitutes a preferred embodiment of this invention.

In accordance with known practices, the sealless connection 10 comprises six similar joints 16, which are arrayed in side-by-side pairs, in two longitudinal rows, with three joints 16 in each row. The width "w" of each joint 16 is approximately 10 percent of the strapping width. Each region encompassing a pair of the joints 16 is, therefore, about 80 percent as strong as the strapping itself away from such region.

Figure 4:
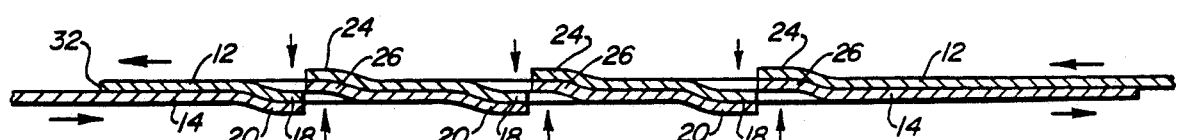
FIG. 4 is a sectional view taken along line 4—4 of FIG. 1, in a direction indicated by arrows, but taken after the shoulders have been formed but before the shoulders have been interlocked and before the notches have been formed.
Figure 5:
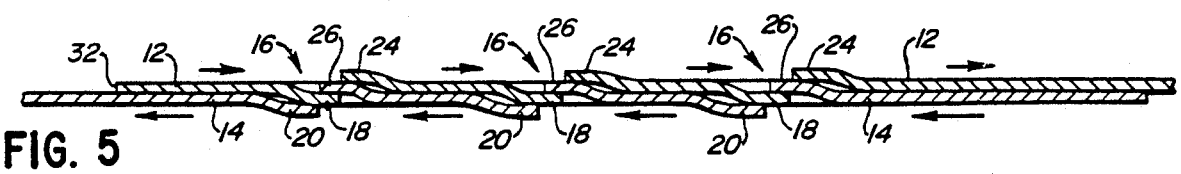
FIGS. 5 and 6, respectively, are sectional views similar to FIG. 4, FIG. 5 having been taken after the shoulders have become interlocked but before the notches have been formed, and FIG. 6 illustrating the notches after formation and after the respective segments have been formed at the notches.
Figure 6:
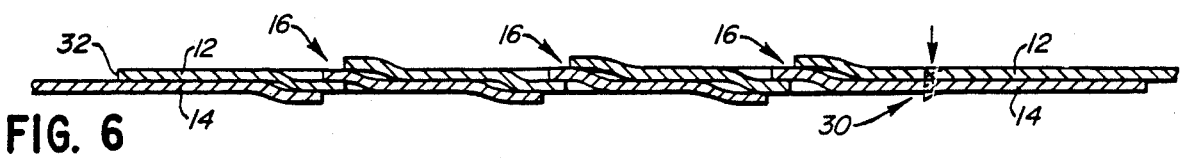

Moreover, each joint 16 comprises a first pair of shoulders 18 and 20, which are defined by Z-shaped slits 22 in the segments 12 and 14, and which are displaced downwardly, as indicated by downwardly pointing arrows in FIG. 4, from adjacent, generally planar portions of the segments 12 and 14. Likewise, each joint 16 comprises a second pair of shoulders 24 and 26, which are defined by the same slits 22 in the segments 12 and 14, and which are displaced upwardly, as indicated by upwardly pointing arrows in FIG. 4, from adjacent, generally planar portions of the segments 12 and 14. As formed in the tensioned loop of strapping by suitable punch and die elements (not shown) of the strapping machine, the shoulders 18, 20, 24, and 26 of each joint 16 are adapted to interlock with each other when the segments 12 and 14 are released under retained tension, as indicated by horizontally pointing arrows in FIGS. 4 and 5, so as to shift the segments 12 and 14 longitudinally with respect to each other in a locking direction.

In accordance with this invention, the sealless connection 10 further comprises, as an "anti-reverse" locking means, notches 30 provided respectively in the overlapped edges of the segments 12 and 14, on the opposite edges of the respective segments 12 and 14. The notches 30 are provided, by suitable notching elements (not shown) of the strapping machine, after the shoulders 18 and 24 have interlocked. The notches 30 are preferably aligned with each other, although alignment is not requisite.

As shown in FIGS. 1, 2, 3, and 6, each notch 30 is defined by a single slit in each of the respective segments 12 and 14. The notched edges of the respective segments 12 and 14 are uninterrupted, except for the notches 30, at least where the respective segments 12 and 14 are formed in a manner to be next described.

The respective segments 12 and 14 are deformed at the notches 30, as shown in FIGS. 1, 2, 3, and 6, to prevent the segments 12 and 24 from shifting longitudinally with respect to each other. The segments 12 and 14 are formed on oblique axes (i.e., on axes that are oblique in relation to the respective segments 12 and 14) at the slits defining the notches 30. Preferably, as shown, the respective segments 12 and 14 are formed only on one side of each notch 30, namely, the side facing away from a distal end 32 of the upper segment 12. However, the formation may be in either direction perpendicular to the plane defined by the strap and the strap segments may be deformed in opposite perpendicular directions.

Thus, if a load (not shown) strapped by the tensioned loop of steel strapping with the sealless connection 10 is dropped or jostled, the sealless connection 10 is prevented from opening accidentally from a compressive or relieved load. It will be necessary to cut the loop in order to remove it from the load.

So as not to unduly weaken the loop of steel strapping, the width "y" of each notch 30, when measured across the strapping width, is limited to about 10 percent of the strapping width. Each region encompassing a pair of the notches 30 is, therefore, about 80 percent as strong as the strapping itself away from such regions, and about as strong as each region encompassing a pair of the joints 16.

As noted above, the notched edges of the respective segments 12 and 14 are uninterrupted, except for the notches 30, at least where the respective segments 12 and 14 are formed. Thus, there are no narrow fingers which could break off or become distorted if forces tending to produce relative movement of the overlapped, connected segments 12 and 14 in relation to each other were severe.

If desired, the respective segments 12 and 14 may be similarly notched and formed between the distal end 32 of the upper segment 12 and the joints 16 nearest the same end 32. Other modifications may be made without departing from the spirit of this invention.

We claim:

1. In a sealless connection between two overlapped segments of strapping, the sealless connection comprising plural interlocking joints;

each joint comprising plural shoulders defined respectively by slits in the respective segments, displaced from adjacent portions of the respective segments, and adapted to become interlocked with each other when the respective segments are shifted longitudinally in relation to each other in a locking direction;

the shoulders tending to unlock from each other when the respective segments are shifted longitudinally in relation to each other in an opposite direction;

the improvement for said sealless connection comprising a notch cut from overlapped edges of the respective segments after the shoulders have become interlocked with each other; the notch being defined by a single slit in each of the respective segments; the respective segments being formed at the notch, along axes oblique in relation to the respective segments, to prevent shifting of the respective segments longitudinally in said opposite direction;

the notched edges of the respective segments being uninterrupted, except for the notch, where the respective segments are formed.

2. The improvement as claimed in claim 1 wherein said interlocked straps have at least one of said notches provided respectively on opposite edges of the respective segments.

3. The improvement as claimed in claim 2 wherein the notches are aligned with each other.

4. The improvement as claimed in claim 2 wherein the respective segments are formed only on the side of each notch facing away from a distal end of the upper segment.

5. The improvement as claimed in claim 4 wherein the notches are aligned with each other.

6. The improvement as claimed in claim 2 wherein said respective strap segments are each formed in a direction away from the plane defined between the overlapping strap segments.

7. The improvement as claimed in claim 2 wherein said respective segments are formable together in either direction perpendicular to the plane defined between the overlapping strap segments.

* * * * *

UNITED STATES PATENT AND TRADEMARK OFFICE
CERTIFICATE OF CORRECTION

PATENT NO. : 4,825,512

DATED : May 2, 1989

INVENTOR(S) : Donald R. Tremper; Timothy B. Pearson

It is certified that error appears in the above-identified patent and that said Letters Patent is hereby corrected as shown below:

Column 1, line 29, "3,188,706" should read --2,276,988--.

Signed and Sealed this

Twenty-seventh Day of February, 1990

Attest:

JEFFREY M. SAMUELS

Attesting Officer

Acting Commissioner of Patents and Trademarks